United States Patent
Xiao et al.

(10) Patent No.: US 8,572,076 B2
(45) Date of Patent: Oct. 29, 2013

(54) LOCATION CONTEXT MINING

(75) Inventors: Rong Xiao, Beijing (CN); Jiangming Yang, Beijing (CN); Lei Zhang, Beijing (CN); Xingrong Chen, Macau (CN)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 12/764,977

(22) Filed: Apr. 22, 2010

(65) Prior Publication Data

US 2011/0264655 A1    Oct. 27, 2011

(51) Int. Cl.
*G06F 17/30*    (2006.01)

(52) U.S. Cl.
USPC ............ 707/728; 707/729; 707/723; 707/769

(58) Field of Classification Search
USPC .................................................. 707/728, 729
See application file for complete search history.

(56) References Cited

U.S. PATENT DOCUMENTS

| | | | |
|---|---|---|---|
| 6,182,008 B1 | 1/2001 | Nikiel et al. | |
| 6,321,158 B1 | 11/2001 | DeLorme et al. | |
| 7,379,811 B2 | 5/2008 | Rasmussen et al. | |
| 7,463,976 B2 | 12/2008 | Nomura | |
| 7,472,338 B2 | 12/2008 | Carro | |
| 7,475,010 B2 | 1/2009 | Chao | |
| 7,548,915 B2 | 6/2009 | Ramer et al. | |
| 7,698,332 B2 * | 4/2010 | Liu et al. | 707/728 |
| 7,734,641 B2 | 6/2010 | Kanigsberg | |
| 7,788,134 B1 | 8/2010 | Manber et al. | |
| 7,826,965 B2 * | 11/2010 | Sadri et al. | 701/438 |
| 8,095,303 B1 | 1/2012 | Nesbitt et al. | |
| 2002/0128767 A1 | 9/2002 | Cardno et al. | |
| 2002/0143490 A1 | 10/2002 | Maeda et al. | |
| 2003/0093217 A1 | 5/2003 | Petzold et al. | |
| 2004/0059708 A1 | 3/2004 | Dean et al. | |
| 2005/0216464 A1* | 9/2005 | Toyama et al. | 707/9 |
| 2005/0234991 A1 | 10/2005 | Marx et al. | |
| 2005/0278378 A1 | 12/2005 | Frank | |
| 2006/0047690 A1* | 3/2006 | Humphreys et al. | 707/102 |
| 2006/0230033 A1* | 10/2006 | Halevy et al. | 707/3 |
| 2007/0005419 A1 | 1/2007 | Horvitz et al. | |
| 2007/0010942 A1 | 1/2007 | Bill | |
| 2007/0150188 A1 | 6/2007 | Rosenberg | |
| 2007/0179863 A1 | 8/2007 | Stoll | |
| 2007/0198182 A1 | 8/2007 | Singh | |

(Continued)

OTHER PUBLICATIONS

F. Jing, L. Zhang and W.Y. Ma Virtual Tour: An online Travle Assistant based on High Quality Images. MM,2006 http://research.microsoft.com/en-us/um/people/leizhang/Paper/ACMMM06-VT.pdf.*

(Continued)

*Primary Examiner* — Wilson Lee
*Assistant Examiner* — Tiffany Thuy Bui
(74) *Attorney, Agent, or Firm* — Hope Baldauff, LLC

(57) ABSTRACT

Concepts and technologies are described herein for mining location contexts within document text. Through an implementation of the concepts and technologies presented herein, functionality can be provided for location context mining within articles, websites, travelogues, or other such documents. A location context is a concept associated with a specific location. For example, the contexts "beach" and "hula" are associated with Hawaii. Similarly, "glacier" and "polar bear" are contexts associated with Alaska. Location context mining can automatically discover locations and location contexts by mining information from a set of documents. User interfaces to support queries of the mined information are also presented herein.

16 Claims, 5 Drawing Sheets

(56) References Cited

U.S. PATENT DOCUMENTS

| | | |
|---|---|---|
| 2007/0219968 A1 | 9/2007 | Frank |
| 2008/0010605 A1 | 1/2008 | Frank |
| 2008/0033903 A1* | 2/2008 | Carol et al. .................. 707/1 |
| 2008/0082578 A1 | 4/2008 | Hogue et al. |
| 2008/0086468 A1 | 4/2008 | Jing et al. |
| 2008/0086686 A1 | 4/2008 | Jing et al. |
| 2008/0125969 A1* | 5/2008 | Chen et al. .................. 701/211 |
| 2008/0319974 A1 | 12/2008 | Ma et al. |
| 2009/0005981 A1 | 1/2009 | Forstall et al. |
| 2009/0019066 A1* | 1/2009 | Wang et al. .................. 707/100 |
| 2009/0070297 A1 | 3/2009 | Hadzima, Jr. et al. |
| 2009/0119255 A1* | 5/2009 | Frank et al. .................. 707/3 |
| 2009/0156229 A1 | 6/2009 | Hein et al. |
| 2009/0303036 A1* | 12/2009 | Sahuguet .................. 340/539.13 |
| 2010/0179754 A1 | 7/2010 | Faenger et al. |
| 2011/0072025 A1 | 3/2011 | van Zwol et al. |
| 2011/0077848 A1 | 3/2011 | Xiao et al. |
| 2011/0078139 A1 | 3/2011 | Xiao et al. |
| 2011/0078575 A1 | 3/2011 | Xiao et al. |
| 2011/0145235 A1 | 6/2011 | Lei et al. |
| 2011/0252025 A1* | 10/2011 | Jin et al. .................. 707/725 |
| 2011/0264664 A1 | 10/2011 | Xiao et al. |
| 2011/0271232 A1* | 11/2011 | Crochet et al. .................. 715/810 |

OTHER PUBLICATIONS

Mior, Michael, "Rapid Prototyping of a Mobile Location-Based Tour Guide", Retrieved at <<http://www.cs.toronto.edu/~mmior/thesis.pdf>>, Dec. 12, 2008, pp. 22.
Goy, et al., "Tailoring the Recommendation of Tourist Information to Heterogeneous User Groups", Retrieved at <<http://www.di.unito.it/~giovanna/papers/ah01.pdf>>, 2001, pp. 15.
Brunato, et al., "A Location-Dependent Recommender System for the Web", Retrieved at <<http://dit.unitn.it/~brunato/pubblicazioni/MobEA.pdf>>, Jan. 30, 2005, pp. 5.
Park, et al., "Location-Based Recommendation System Using Bayesian User's Preference Model in Mobile Devices", Retrieved at <<http://sclab.yonsei.ac.kr/publications/Papers/IC/UIC07-MHPark.pdf>>, Aug. 15, 2007, pp. 10.
Takeuchi, et al., "An Outdoor Recommendation System based on User Location History", Retrieved at <<http://ftp.informatik.rwth-aachen.de/Publications/CEUR-WS/Vol-149/paper14.pdf>>, 2005, pp. 91-100.
"BootsnAll," Retrieved Aug. 7, 2009 from http://www.bootsnall.com, 2 pages.
"Embed Google Maps on your Website or Blog," Sep. 5, 2007, Retrieved from http://www.labnol.org/internet/blogging/embed-google-maps-on-your-website-or-blog/1316/, 1 page.
"Expedia," Retrieved Aug. 7, 2009 from http://www.expedia.com, 2 pages.
Free Geography Tools, Jul. 19, 2007, pp. 1-10.
"Geographic Information System," Wikipedia, Retrieved Aug. 6, 2009 from http://en.wikipedia.org/wiki/GIS, 18 pages.
"GeoSense Mobility Complete Mobile Workforce Management Platform," Retrieved Aug. 11, 2009 from http://enovia.ca/site/GeoSenseMobility.php, pp. 3.
"Getjealous," Retrieved Aug. 7, 2009 at http://www.getjealous.com, 2 pages.
"Inserting HTML Code into your Web Site," Retrieved Aug. 11, 2009 from http://office.microsoft.com/en-us/officelive/FX102223081033.aspx?mode=print, 6 pages.
"Microsoft Streets & Trips 2001 Planning a Road Trip," 2001, Retrieved Aug. 6, 2009 from http://www.webjunction.org/c/document_library/get_file?folderId=431408&name=DLFE-10121.pdf, Lesson 16, pp. 147-154.
"Realtravel," Retrieved Aug. 7, 2009 from http://www.realtravel.com, 3 pages.
"Road Trip," Retrieved Aug. 6, 2009 from http://download.microsoft.com/download/2/4/b/24bb8c05-8bd4-4cac-89ff-0901bf3b8468/RoadTrip.doc, 1 Page.
"Shortest Path Problem," Wikipedia, Retrieved Aug. 7, 2009 from http://en.wikipedia.org/wiki/Shortest_path, 4 pages.
"Travelblog," Retrieved Aug. 7, 2009 from http://www.travelblog.org, 4 pages.
"Traveljournals," Retrieved Aug. 7, 2009 from http://www.traveljournals.net, 1 page.
"Travelling Salesman Problem," Wikipedia, Retrieved Aug. 7, 2009 from http://en.wikipedia.org/wiki/Traveling_salesman_problem, 8 pages.
"Travelogue," Retrieved Aug. 6, 2009 from http://sourceforge.net/projects/travelogue/, 1 page.
"Travelpod," Retrieved Aug. 7, 2009 from http://www.travelpod.com, 4 pages.
"Travelpost," Retrieved Aug. 7, 2009 from http://www.travelpost.com, 1 page.
"Web User Experience," Retrieved Aug. 11, 2009 from http://research.microsoft.com/en-us/projects/wue/, 2 pages.
"Yahoo! Placemaker™ Beta," Retrieved Sep. 23, 2009 from http://developer.yahoo.com/geo/placemaker/, 2 pages.
Amitay et al., "Web-a-Where: Geotagging Web Content," Jul. 25-29, 2004, *Proceedings of SIGIR '04*, Sheffield, South Yorkshire, UK, pp. 273-280.
Brunato et al., "A Location-dependent Recommender System for the Web," 2002, *Technical Report DIT-02-093, Ingengneria e Scienca dell'Informazione*, University of Trento, Italy, 5 pages.
Cucerzan, "Large-scale Named Entity Disambiguation Based on Wikipedia Data," Jun. 2007, *Proceedings of the 2007 Joint Conf. on Empirical Methods in Natural Language Processing and Computational Natural Language Learning*, pp. 708-716.
Ardissono et al. "Tailoring the Recommendation of Tourist Information to Heterogeneous User Groups," 2002, *Proceeding, Revised Papers from the International Workshops OHS-7, SC-3, and AH-3 on Hypermedia: Openness, Structural Awareness, and Adaptivity*, pp. 280-295.
Hassell, IV "Ontology-driven Automatic Entity Disambiguation in Unstructured Text," 2006, Thesis, University of Georgia, 96 pages.
Leidner et al., "Grounding Spatial Named Entities for Information Extraction and Question Answering," 2003, *Proceedings of the HLT-NAACL 2003 Workshop on Analysis of Geographic References*—vol. 1, pp. 31-38.
Li et al.,"Infoxtract Location Normalization: A Hybrid Approach to Geographic References in Information Extraction," 2003, *Proceedings of the HLT-NAACL 2003 Workshop on Analysis of Geographic References*, vol. 1, pp. 39-44.
Li et al., "Location Normalization for Information Extraction," 2002, *Proceedings of the 19th Int'l Conference on Computational Linguistics*, vol. 1, pp. 1-7.
Ma et al., "A Localness-Filter for Searched Web Pages", 2003. *Lecture Notes in Computer Science*. vol. 2642/2003, pp. 525-536.
Martens, "On Usability of Web Services," Dec. 13, 2003, *Proceedings of 4th Int'l Conference on Web Information Systems Engineering Workshops*, pp. 182-190.
McCurley, "Geospatial Mapping and Navigation of the Web," May 1-5, 2001, *Proceedings of WWW10*, Hong Kong, pp. 221-229.
Moxley, "SpiritTagger: A Geo-Aware Tag Suggestion Tool Mined from Flickr," 2008, pp. 24-30.
Overell et al., "Geographic Co-occurrence as a Tool for GIR," Nov. 9, 2007, *ACM*, 6 pages.
Pouliquen et al., "Geographical Recognition and Visualization in Texts Written in Various Languages," Mar. 14-17, 2004, *ACM Symposium on Applied Computing*, 8 pages.
Rauch et al., "A Confidence-Based Framework for Disambiguating Geographic Terms," 2003, *Proceedings of the HLT-NAACL 2003 Workshop on Analysis of Geographic References*—vol. 1, pp. 50-54.
Ricci, "Travel Recommender Systems," Nov./Dec. 2002, *IEEE Intelligent Systems*, 17(6): 55-57.
Rogers, et al., "An Adaptive Interactive Agent for Route Advice," 1999, *Proceedings of the third annual conference on Autonomous Agents*, pp. 198-205.
Silvia et al., "Adding Geographic Scopes to Web Resources," 2004, *Workshop on Geographic Information Retrieval*, Sheffield, UK, 3 pages.

(56) References Cited

OTHER PUBLICATIONS

Sundheim, "Resources to Facilitate Progress in Place Name Identification and Reference Resolution," 2002, *Proceedings of the 2nd Int'l Conference on Human Language Technology Research*, pp. 319-324.

Wang et al., "Application-Driven Web Resource Location Classification and Detection," Mar. 2005, retrieved from http://research.microsoft.com/pubs/70152/tr-2005-32.pdf, 10 pages.

Wang et al., "Detecting Dominant Locations from Search Queries," 2005, *Proceeding of SIGR Conference on Research and Development in Information Retrieval*, pp. 424-431.

Wang et al., "Detecting Geographic Locations from Web Resources," Nov. 4, 2005, *Proceedings of GIR '05*, Bremen, Germany, pp. 17-24.

Wang et al., "Web Resource Geographic Location Classification and Detection," May 10-15, 2005, *Proceedings of WWW 2005*, Chiba, Japan, pp. 1138-1139.

Zheng et al., "Mining Interesting Locations and Travel Sequences from GPS Trajectories," Apr. 20-24, 2009, *Proceedings of the 18th Int'l Conference on World Wide Web*, Madrid, Spain, pp. 791-800.

U.S. Official Action dated Dec. 19, 2011 in U.S. Appl. No. 12/568,735.

U.S. Official Action dated Mar. 26, 2012 in U.S. Appl. No. 12/568,749.

U.S. Official Action dated Feb. 29, 2012 in U.S. Appl. No. 12/764,989.

U.S. Notice of Allowance dated May 23, 2012 in U.S. Appl. No. 12/568,725.

U.S. Notice of Allowance dated May 23, 2012 in U.S. Appl. No. 12/568,735.

U.S. Official Action dated Oct. 24, 2012 I U.S. Appl. No. 12/764,989.

U.S. Official Action dated Dec. 13, 2012 in U.S. Appl. No. 12/568,749.

U.S. Official Action dated Apr. 4, 2013 in U.S. Appl. No. 12/764,989.

\* cited by examiner

LOCATION CONTEXT MINING

BACKGROUND

There is a rich body of documents that may provide information associated with a location. For example, travelogues are textual descriptions of a person's experience with a particular location. For instance, a person might travel to New York City and write a travelogue that describes their travel experience.

Travelogues are currently written and shared in a variety of different scenarios on the Internet. For instance, travelogues can be shared by way of content presented on World Wide Web (Web) sites, Web forums, Web logs (blogs), social networking sites, and in myriad other ways. A large number of such sites are currently available on the Internet for writing and sharing travelogues. The large number of disparate sites containing travelogues and similar documents may prove troublesome to users or automated search mechanisms attempting to find relationships of concepts and contexts within the documents.

It is with respect to these and other considerations that the disclosure made herein is presented.

SUMMARY

Concepts and technologies are described herein for mining location contexts within document text. Through an implementation of the concepts and technologies presented herein, functionality can be provided for location context mining within articles, websites, travelogues, or other such documents. A location context is a concept associated with a specific location. For example, the contexts "beach" and "hula" are associated with Hawaii. Similarly, "glacier" and "polar bear" are contexts associated with Alaska. Location context mining can automatically discover locations and location contexts by mining information from a set of documents.

According to one aspect presented herein, location context mining can leverage location name identification to recognize locations contained within the documents. Also, context words associated with these locations may be identified from the documents. Associations between the geographical location names and contexts may be established and relevance scores may be determined to quantify these associations and support search queries.

According to another aspect presented herein, a user interface and associated query can support identifying locations associated with a specified location context. Similarly, a user interface and associated query can support identifying location contexts associated with a specified location. The user interfaces can support map displays to geographically locate results. Result listings may also be provided to support linking to associated documents and document locations.

It should be appreciated that the above-described subject matter might also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
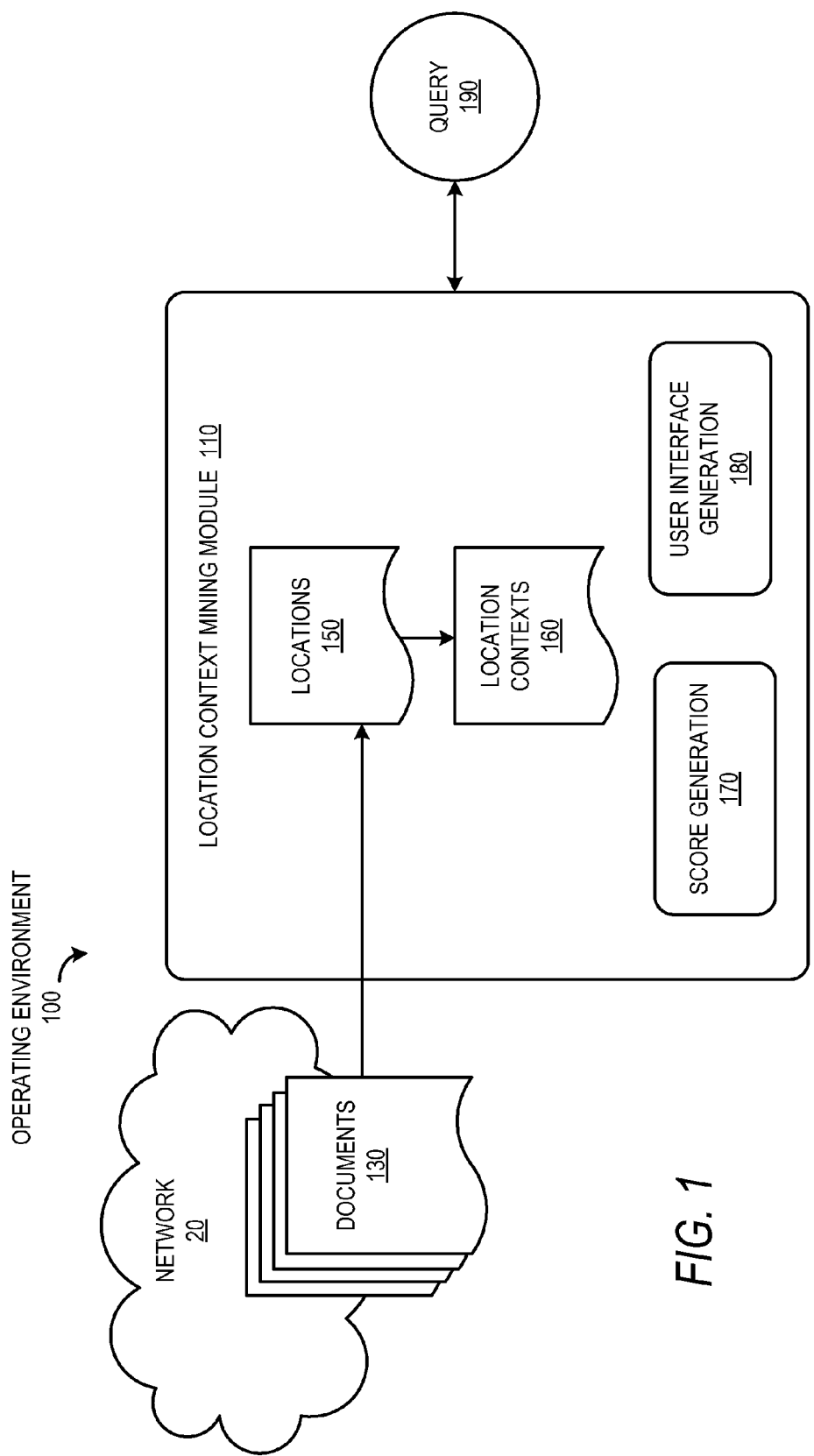
FIG. 1 is a system diagram illustrating aspects of one operating environment for the various embodiments presented herein.

The following detailed description is directed to technologies for mining location contexts within document text. The technology presented herein can support location and context related searching within a set of documents. For example, a user researching wild animals in Alaska may ask two types of questions. The first type may relate to the types of wild animals making their habitat in Alaska. The second type of question may relate to which locations, such as which national parks, may be associated with a specific type of animals. Similarly, users planning an outing to the seaside may ask which location has beautiful beach. Traditional online map systems generally fail to directly answer these types of location associated questions. For example, a user may have traditionally had to browse tens of online documents to find the desired information.

The location context mining system presented herein can support location information search such as those examples given above. The location context mining system presented herein can associate a style word, or context word, with a geographical specific location. For example, "beach" and "hula" are context words that may be associated with the location name "Hawaii," and "glacier" and "polar bear" are context words that may be associated with the location word "Alaska." These location context associations may be automatically mined from online travelogues and other sets of documents.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system, computer-readable storage medium, and computer-implemented methodology for mining location contexts within document text will be presented.

Referring now to FIG. 1, aspects of one operating environment 100 for the various embodiments presented herein will be described. A location context mining module 110 can mine one or more documents 130 for relationships between location names and location context words. The documents 130 may be located on servers within a network 20. For example, the documents may be travel web sites, travel blogs, travelogues, or any other documents containing references to geographical locations. The location names may be identified within the documents 130 as a set of locations 150. The location context words may be identified within the documents 130 as a set of location contexts 160.

A task within the location context mining module 110 supporting score generation 170 may be configured to generate one or more scores for each possible pairing of locations 150 and location contexts 160. A task within the location context mining module 110 supporting user interface generation 180 may be configured to respond to a query 190 from a user or other automated system. User interface generation 180 may include responding to queries with information. User interface generation 180 may also include the generation of graphical user interfaces (GUI) such as those discussed herein for location searching and context searching.

Score generation 170 may include various scores serving as metrics of the associations or relationships between each pairing of locations 150 and location contexts 160. Such scores may be referred to as popularity scores, relevancy scores, and so forth. An example of such a score may reflect the relevance between locations 150 and location contexts 160 that can be calculated for a given set of documents $\{D_i\}$ where a location list $\{X_{i,j}\}$ is extracted. Each element of the list of location words $X_{i,j}$ is the $j^{th}$ location in the document $D_i$. The set of all possible location context words $c_{i,j}$ for each location words $X_{i,j}$ can be defined according to the following expression:

$$c_{i,j} = \{w_{i,j}^k \in D_i | l(X_{i,j}, w_{i,j}^k) \leq T\}$$

where $w_{i,j}$ is the $k^{th}$ word in the document $D_i$, the function $l(\ldots)$ is a measure of the distance between two words, and T is a predefined threshold. That is, there are less than T words between the location word $X_{i,j}$ and the word $w_{i,j}^k$ in the document D. As such, the possible context words for the location word $X_{i,j}$ is the set of words positioned within T words of $X_{i,j}$ in the document.

The context word set $c_{i,j}$ will generally contain many commonly used words that may not actually serve as context to the location word $X_{i,j}$. A measure of inverse document frequency (IDF) may be employed to reduce the scores of commonly used words such as those that are common across many documents and are thus less likely to meaningfully relate to location word $X_{i,j}$. Examples of such words may include "a," "the," "however," or "having." In contrast, words like "luau" or "Jupiter" are not likely to be observed commonly across many documents. Common words will generally have relatively high document frequency and thus relatively low IDF. Thus, IDF may be multiplied, or otherwise factored, into the scoring to reduce the relevancy of such common words. For example, a term frequency-inverse document frequency (TF-IDF) score may be calculated for $\{X_i, w_i\}$ where $\{X_i\}$ is the set of all possible locations and $\{w_i\}$ is the set of all possible context words.

The TF-IDF score may serve as a metric of the relevance of a term to a document within a set of documents. The relevance is proportional to the number of times a word appears in the document. However, the relevance is lowered by the number of times the word appears in all documents of the set. A term count within a document is the number of times that the given term appears in the document. The term count may be normalized to prevent a bias towards long documents. The term frequency (TF) may be determined according to the expression:

$$tf_{i,j} = \frac{q_{i,j}}{\sum_k q_{k,j}}$$

where $q_{i,j}$ is the number of appearances of the term t, in the document $D_j$, and the denominator is the sum of number of occurrences of all terms in document $D_j$.

The IDF may be obtained by dividing the total number of documents by the number of documents containing the term. A logarithm may then be taken of that result, such as in the following expression:

$$idf_i = \log \frac{n(D)}{1 + n(D | t_i \in D)}$$

where n(D) is the total number of documents in the document set, and the denominator is the number of documents where the word t, appears in the document with the "1" term in place to prevent a division-by-zero.

These results may then be combined according to the expression:

$$(tf\text{-}idf)_{i,j} = tf_{i,j} \times idf_i$$

where a higher TF-IDF score implies a higher term frequency and a low document frequency of the term in the whole set of documents. Thus the TF-IDF score tends to filter out common words.

Figure 2:
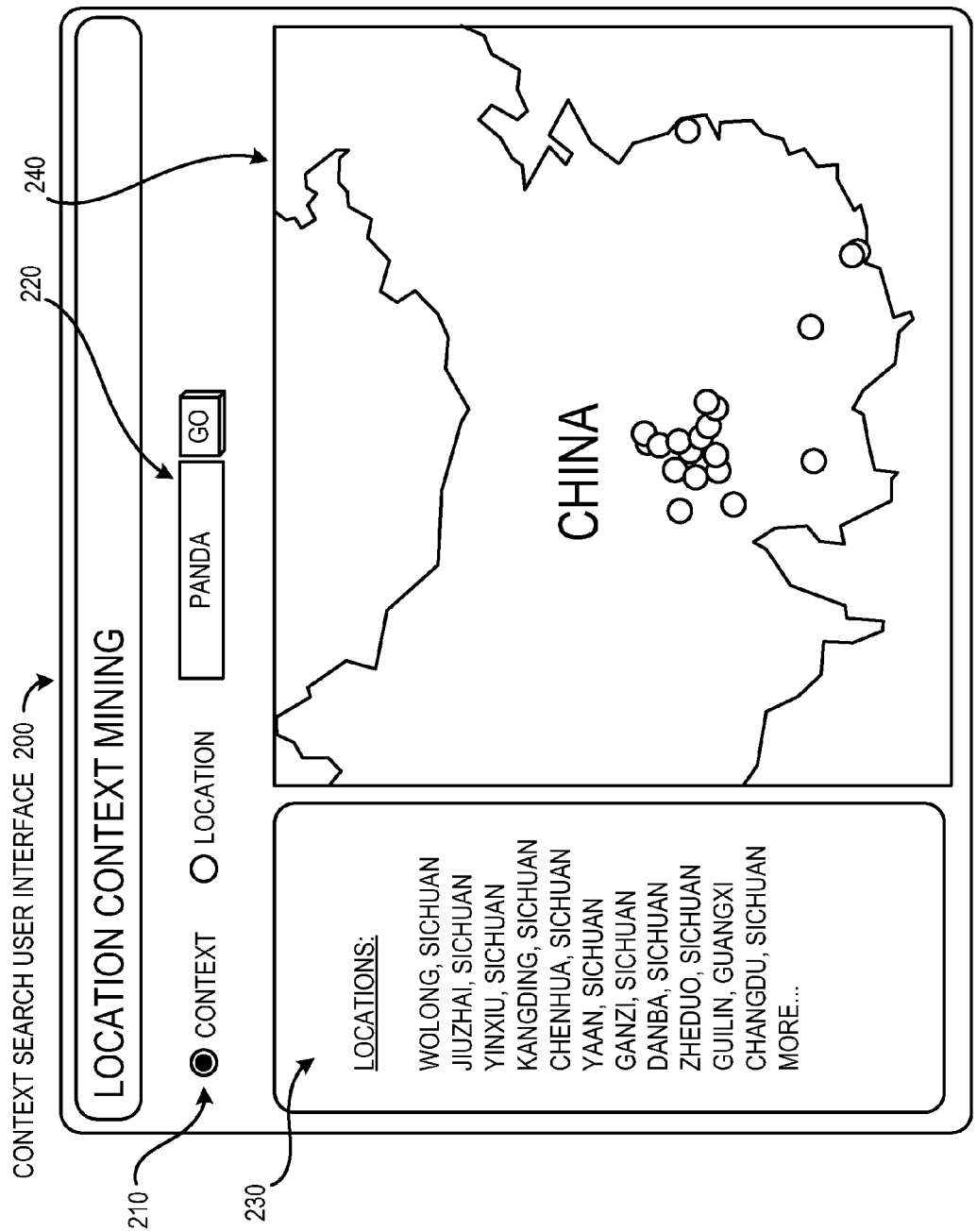
FIG. 2 is a user interface diagram illustrating aspects of a context search user interface according to various embodiments presented herein.

Referring now to FIG. 2, a user interface diagram illustrating aspects of a context search user interface 200 according to various embodiments presented herein will be described. A window, web page, or other user interface display may support location context mining by presenting a context search user interface 200. A user input element such as a set of radio buttons 210 can support a user selecting between a location search and a location context search. In the case of a location context search being selected, the user can enter a location context word into a text input box 220. The search will then identify locations associated with the specified location context word. In the case of a location search being selected, the user can enter a location word into the text input box 220. The search will then identify location contexts associated with the specified location word.

In the illustrated example, a context search is specified by the user at the radio buttons 210 and the location context word "panda" is provided for the search basis in the text input box 220. In response to the specified search, a location list 230 may be generated listing locations associated with the location context word entered into the text input box 220. For example, locations may be listed that are associated with pandas. These may be locations where pandas are found.

The association between the context "panda" and the resultant locations may be based upon the scores from score generation 170. The elements of the location list 230 may be ordered according to the generated scores. The elements of the location list 230 may be presented as a list of hyperlinks. When the user selects one of the hyperlinks, the corresponding location may be centered and highlighted on a map display 240. Selection of the hyperlink may also provide access to the documents by which the relationships between the location words and location context words were established.

Figure 3:
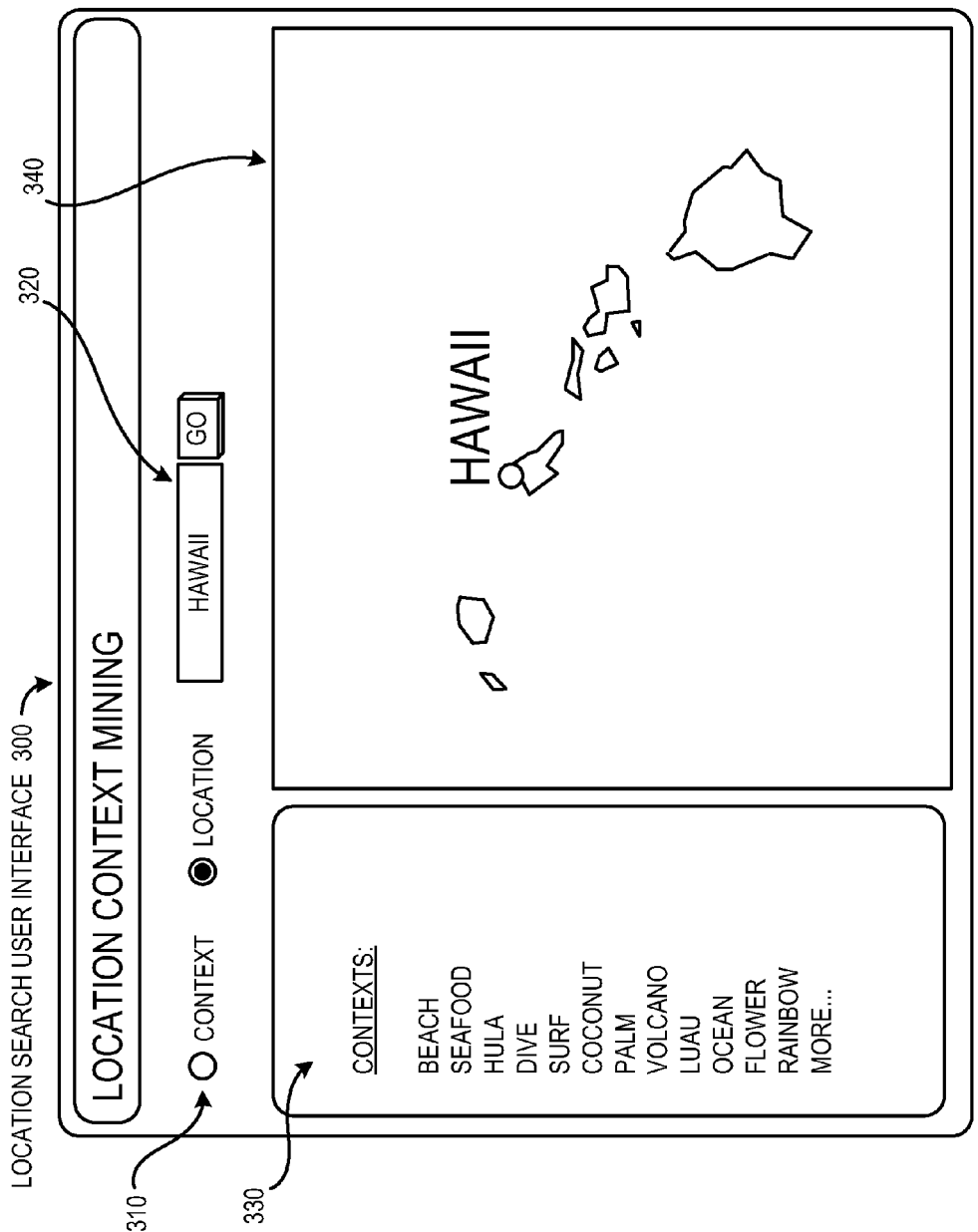
FIG. 3 is a user interface diagram illustrating aspects of a location search user interface according to various embodiments presented herein.

Referring now to FIG. 3, a user interface diagram illustrating aspects of a location search user interface 300 according to various embodiments presented herein will be described. A window, web page, or other user interface display may support location context mining by presenting a location search user interface 300. A user input element such as a set of radio buttons 310 can support a user selecting between a location search and a location context search. In the case of a location context search being selected, the user can enter a location context word into a text input box 320. The search will then identify locations associated with the specified location context word. In the case of a location search being selected, the user can enter a location word into the text input box 320. The search will then identify location contexts associated with the specified location word.

In the illustrated example, a location search is specified by the user at the radio buttons 310 and the location word "Hawaii" is provided for the search basis in the text input box 320. In response to the specified search, a context list 330 may be generated listing context words associated with "Hawaii" such as "beach," "surf," "luau," and "volcano." Also, a map 340 may be displayed showing the geographical location associated with the location word "Hawaii" entered at the text input box 320.

The elements of the context list 330 may be ordered according to the generated scores. The elements of the context list 330 may be presented as a list of hyperlinks. When the user selects one of the hyperlinks, the corresponding documents may be displayed. These documents may contain the context words related to the location.

Figure 4:
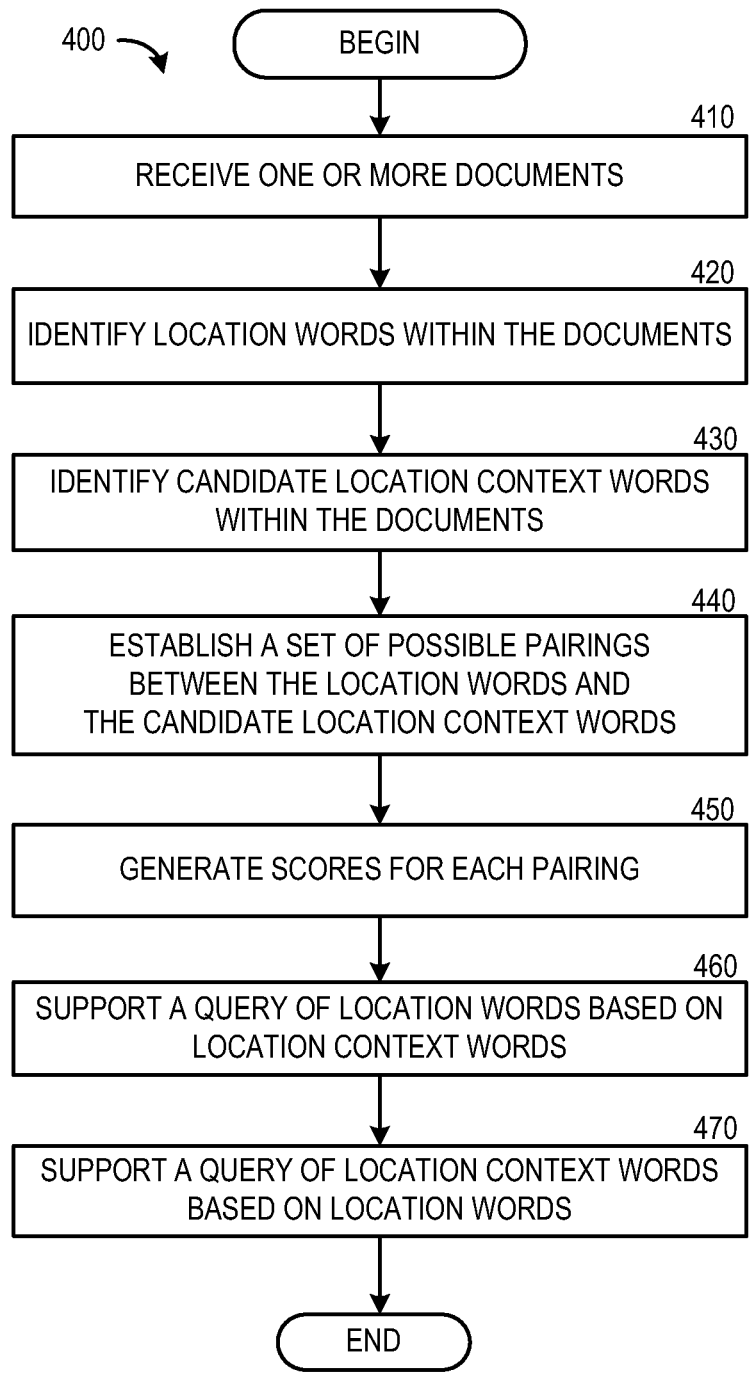
FIG. 4 is a flow diagram showing aspects of one process presented herein for location context mining according to one or more embodiments presented herein.

Referring now to FIG. 4, additional details will be provided regarding the embodiments presented herein for mining location contexts within document text. In particular, FIG. 4 is a flow diagram showing a routine 400 that illustrates aspects of one process presented herein for location context mining.

It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 410, where the location context mining module 110 can receive one or more documents 130. The documents 130 may be travel web sites, travel blogs, travelogues, or any other documents containing references to geographical locations.

At operation 420, the location context mining module 110 can identify location words within documents. The location words may be identified within the documents 130 as a set of geographical locations 150. The location words may be identified by location word extraction, classification, identification, or recognition. These functions may involve searching the documents for location words listed in a predefined location gazetteer.

At operation 430, the location context mining module 110 can identify candidate location context words within documents. The location context words may be identified within the documents 130 as a set of location contexts 160. The location context words may by common (non-geographical) words within a certain word count range from a given location word within the document.

At operation 440, the location context mining module 110 can establish a set of possible pairings between the location words and the candidate location context words. Each of the locations 150 extracted from a document may be paired with the nearby location contexts 160 from the same document. Alternatively, each location 150 may be paired with all of the location contexts 160 or any subset of the location contexts 160.

At operation 450, the location context mining module 110 can generate scores for each pairing. The score generation 170 task within the location context mining module 110 may be configured to generate one or more scores for each possible pairing of locations 150 and location contexts 160. The score generation 170 may include various scores serving as metrics of the associations or relationships between each pairing of locations 150 and location contexts 160. Such scores may be referred to as popularity scores, relevancy scores, and so forth.

At operation 460, the location context mining module 110 can support a query of location words based on location context words. The query can specify a location context word. A search may then identify locations associated with the specified location context word. The location context query may also provide an appropriate user interface such as the context search user interface 200.

At operation 470, the location context mining module 110 can support a query of location context words based on location words. The query can specify a location word. A search may then identify location contexts associated with the specified location word. The location query may also provide an appropriate user interface such as the location search user interface 300. The routine 400 can terminate after operation 470.

Figure 5:
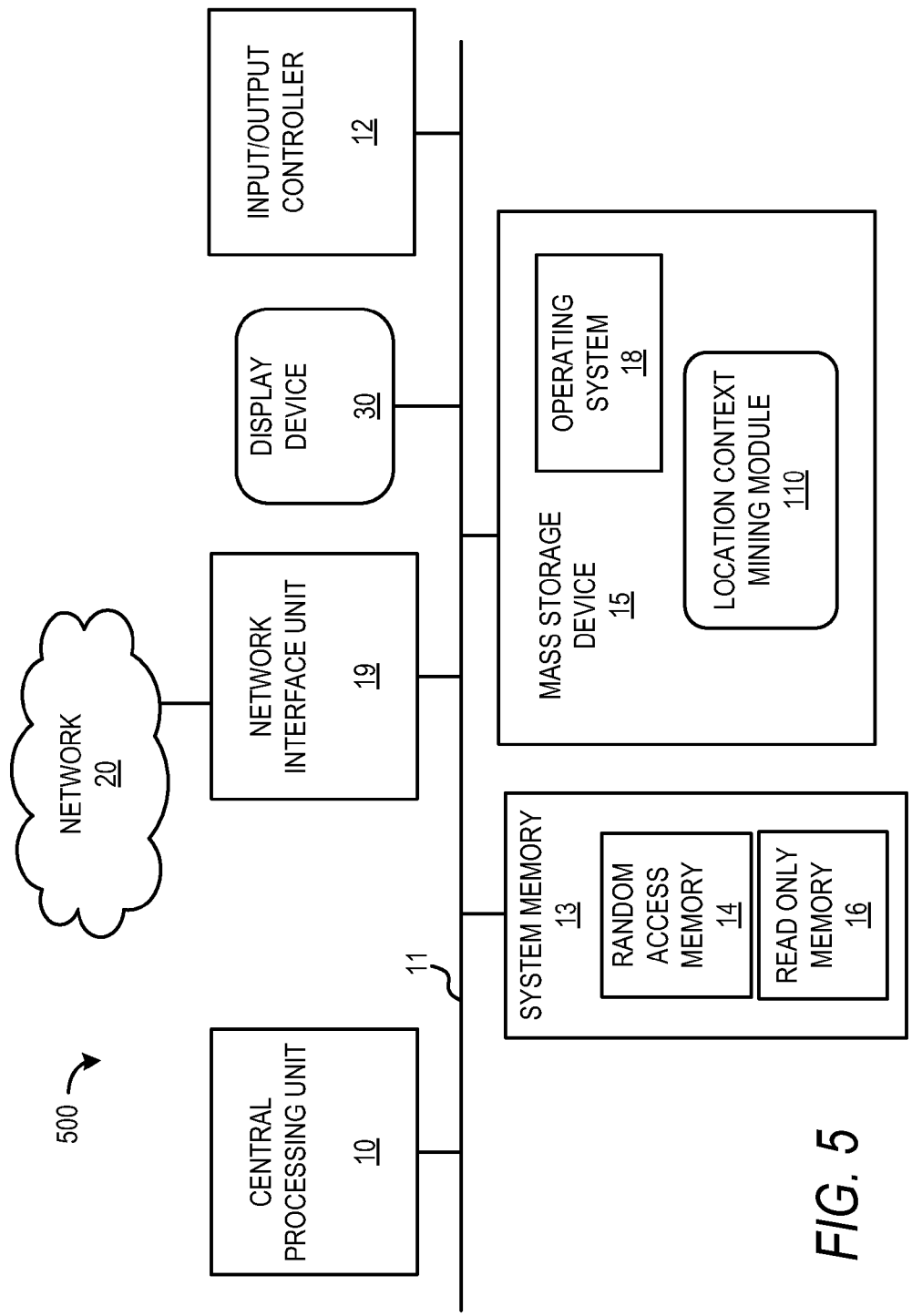
FIG. 5 is a computer architecture diagram showing an illustrative computer hardware and software architecture for a computing system capable of implementing aspects of the various embodiments presented herein.

Turning now to FIG. 5, an illustrative computer architecture for a computer 500 that can execute the software components described herein for mining location contexts within document text. The computer architecture shown in FIG. 5 illustrates a conventional desktop, laptop, or server computer and may be utilized to execute any aspects of the software components presented herein. It should be appreciated however, that the described software components can also be executed on other example computing environments, such as mobile devices, television, set-top boxes, kiosks, vehicular information systems, mobile telephones, embedded systems, or otherwise. The computer architecture 500 may apply to the computer executing the program modules associated with the mining of location contexts within document text.

The computer architecture illustrated in FIG. 5 can include a central processing unit 10 (CPU), a system memory 13, including a random access memory 14 (RAM) and a read-only memory 16 (ROM), and a system bus 11 that can couple the system memory 13 to the CPU 10. The system memory 13 may provide memory 120 used for the location context mining module 110. A basic input/output system containing the basic routines that help to transfer information between elements within the computer 400, such as during startup, can be stored in the ROM 16. The computer 500 may further include a mass storage device 15 for storing an operating system 18, software, data, and various program modules, such as those associated with the location context mining module 110. The program modules can execute portions of software components, processes, and routines described herein.

The mass storage device 15 can be connected to the CPU 10 through a mass storage controller (not illustrated) connected to the bus 11. The mass storage device 15 and its associated computer-readable media can provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 20. The computer 500 may connect to the network 20 through a network interface unit 19 connected to the bus 11. It should be appreciated that the network interface unit 19 may also be utilized to connect to other types of networks and remote computer systems. The computer 500 may also include an input/output controller 12 for receiving and processing input from a number of other devices, including a keyboard, mouse, or electronic stylus (not illustrated). Similarly, an input/output controller 12 may provide output to, a printer, or other type of output device (also not illustrated). A display device 30 may be used for providing output from the computer 500 in the form of text, graphics, video, graphical user interface, any other user interface elements, or any combination thereof.

As mentioned briefly above, a number of program modules and data files may be stored in the mass storage device 15 and RAM 14 of the computer 500, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the program modules associated with the location name identification module 110 for execution by the CPU 10. The mass storage device 15, the ROM 16, and the RAM 14 may also store other types of program modules.

In general, software applications or modules such as those associated with the location context mining module 110 may, when loaded into the CPU 10 and executed, transform the CPU 10 and the overall computer 500 from general-purpose computing systems into special-purpose computing systems customized to perform location context mining. The CPU 10 may be constructed from any number of transistors or other discrete circuit elements, which may individually or collectively assume any number of states. More specifically, the CPU 10 may operate as one or more finite-state machines, in response to executable instructions contained within the software or modules. These computer-executable instructions may transform the CPU 10 by specifying how the CPU 10 transitions between states, thereby physically transforming the transistors or other discrete hardware elements constituting the CPU 10.

Encoding the software or modules onto the mass storage device 15 may also transform the physical structure of the mass storage device 15 or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for location context mining from document text are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for location context mining within document text, the computer-implemented method comprising performing computer-implemented operations for:
  receiving one or more documents;
  identifying, by a computing device, location words within the documents;

identifying, by the computing device, candidate location context words within the documents, the candidate location context words being non-geographic words located within a specified word count of the location words with the documents, the candidate location context words being associated with the identified location words within the documents, where a set of all possible candidate location context words $c_{i,j}$ for each location word in a list of location words $X_{i,j}$ being defined as:

$$c_{i,j} = \{w_{i,j}^k \in D_i \mid /(X_{ij}, w_{ij}^k) \le T\},$$

where $w_{i,j}^k$ is the $k^{th}$ word in a document $D_i$, the function $/(\ldots)$ being a measure of a distance between the two words, and T being a predefined threshold;

establishing, by the computing device, a set of possible pairings between the location words and the candidate location context words; and generating, by the computing device, a score for each pairing comprising a term frequency inverse document frequency (TF-IDF) score.

2. The computer-implemented method of claim 1, further comprising supporting a query of the location words based on one of the candidate location context words.

3. The computer-implemented method of claim 1, further comprising supporting a query of the candidate location context words based on one of the location words.

4. The computer-implemented method of claim 1, further comprising presenting, by the computing device, a graphical user interface for querying the location words based on one of the candidate location context words.

5. The computer-implemented method of claim 1, further comprising presenting, by the computing device, a graphical user interface for querying the candidate location context words based on one of the location words.

6. The computer-implemented method of claim 1, wherein the score for each pairing comprises a relevance score.

7. The computer-implemented method of claim 1, wherein the documents comprise travelogues.

8. An apparatus comprising:
a computing device; and
a memory configured to execute computer-readable instructions thereupon which, when executed by the computing device, cause the computing device to
receive one or more documents;
identify location words within the documents;
identify candidate location context words within the documents, the candidate location context words being non-geographic words located within a specified word count of the location words with the documents, the candidate location context words being associated with the identified location words within the documents, where a set of all possible candidate location context words $c_{i,j}$ for each location word in a list of location words $X_{i,j}$ being defined as:

$$c_{i,j} = \{w_{i,j}^k \in D_i \mid /(X_{ij}, w_{ij}^k) \le T\},$$

where $w_{i,j}^k$ is the $k^{th}$ word in a document $D_i$, the function $/(\ldots)$ being a measure of a distance between the two words, and T being a predefined threshold;

establish a set of possible pairings between the location words and the candidate location context words; and generate a score for each pairing comprising a term frequency inverse document frequency (TF-IDF) score.

9. The apparatus of claim 8, wherein the computing device is further caused to support a query of the location words based on one of the candidate location context words.

10. The apparatus of claim 8, wherein the computing device is further caused to support a query of the candidate location context words based on one of the location words.

11. The apparatus of claim 8, wherein the computing device is further caused to present a graphical user interface for querying the location words based on one of the candidate location context words.

12. The apparatus of claim 8, wherein the computing device is further caused to present a graphical user interface for querying the candidate location context words based on one of the location words.

13. The apparatus of claim 8, wherein the score for each pairing comprises a relevance score.

14. The apparatus of claim 8, wherein the documents comprise travelogues.

15. The apparatus of claim 8, wherein the documents comprise pages within the world wide web.

16. A computer-implemented method for location context mining within document text, the computer-implemented method comprising performing computer-implemented operations for:
receiving one or more documents, wherein the documents comprise travel content within the world wide web;
identifying location words within the documents;
identifying candidate location context words within the documents, the candidate location context words being non-geographic words located within a specified word count of the location words with the documents, the candidate location context words being associated with the identified location words within the documents, where a set of all possible candidate location context words for each location word in a list of location words $X_{i,j}$ being defined as:

$$c_{i,j} = \{w_{i,j}^k \in D_i \mid /(X_{ij}, w_{ij}^k) \le T\},$$

where $w_{i,j}^k$ is the $k^{th}$ word in a document $D_i$, the function $/(\ldots)$ being a measure of a distance between the two words, and T being a predefined threshold;

establishing a set of possible pairings between the location words and the candidate location context words;

generating a relevance score for each pairing;

supporting a query of the location words based on one of the candidate location context words; and supporting a query of the candidate location context words based on one of the location words.

* * * * *